United States Patent [19]

Kettle

[11] 4,434,884

[45] Mar. 6, 1984

[54] SPIRAL ESCALATOR

[75] Inventor: John L. Kettle, Vernon, Conn.

[73] Assignee: Otis Elevator Company, Farmington, Conn.

[21] Appl. No.: 509,982

[22] Filed: Jul. 1, 1983

Related U.S. Application Data

[63] Continuation of Ser. No. 294,087, Aug. 19, 1981, abandoned.

[51] Int. Cl.³ .............................................. B65B 9/12
[52] U.S. Cl. ..................................... 198/328; 198/778
[58] Field of Search ............................... 198/328, 778

[56] References Cited

U.S. PATENT DOCUMENTS 723,325  3/1903  Souder ............................... 198/328
2,677,451  5/1954  Normandeau ....................... 198/328

Primary Examiner—Robert J. Spar
Assistant Examiner—Jonathan D. Holmes
Attorney, Agent, or Firm—Robert E. Greenstien

[57] ABSTRACT

A passenger carrying system for transporting passengers between two floors, comprising a plurality of interconnected steps which move between the floors in a closed pattern that includes sections which spiral down and up between the floors around vertical posts. In the spiral sections the steps form staircases which move along the pattern.

1 Claim, 4 Drawing Figures

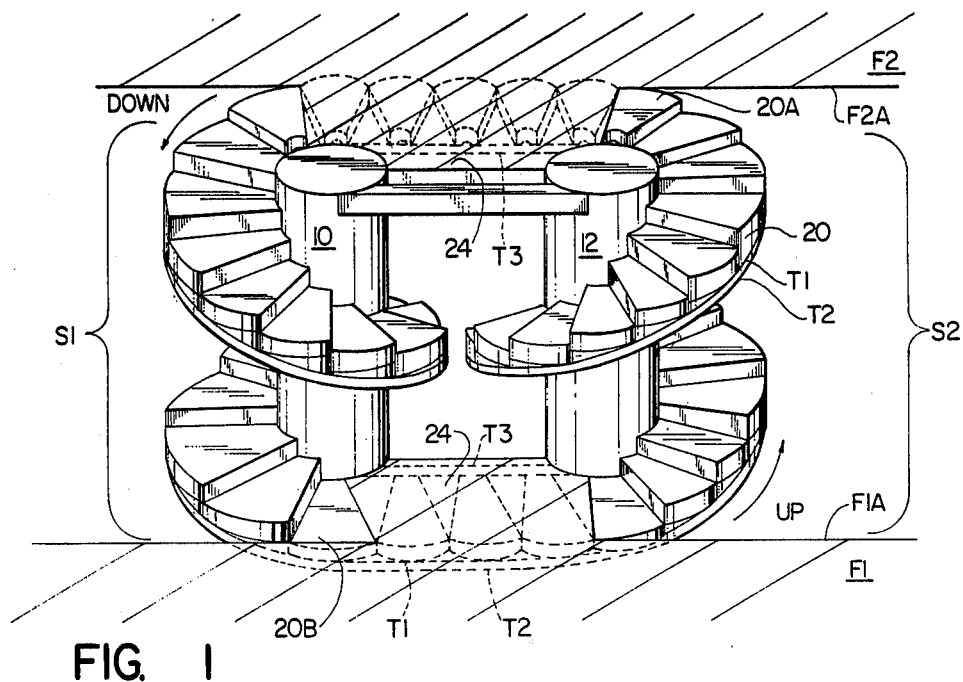
FIG. 1
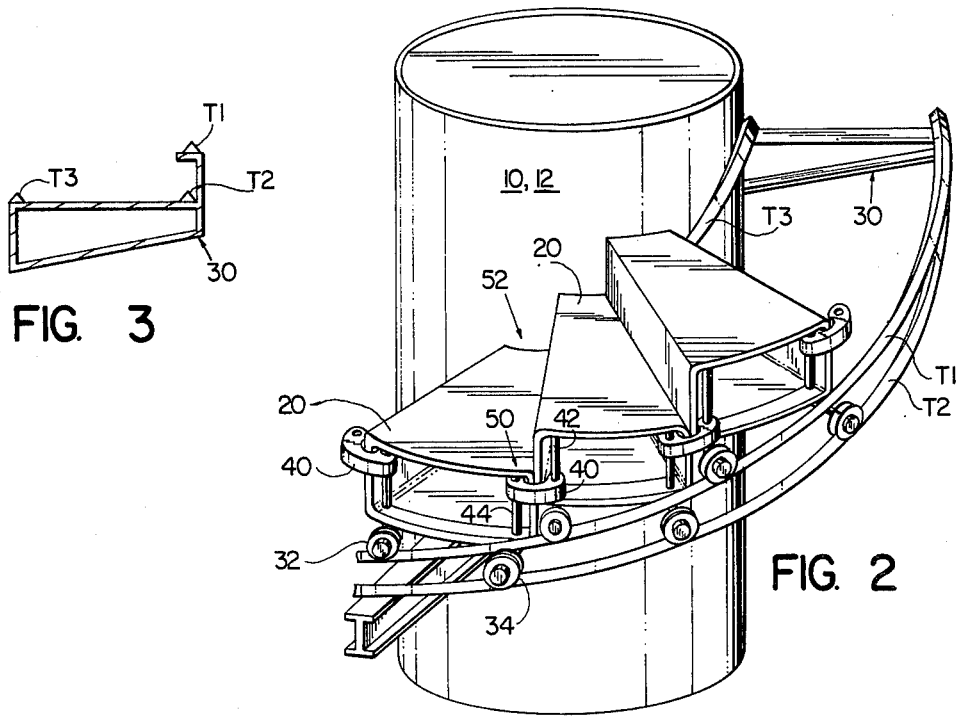
FIG. 3
FIG. 2

SPIRAL ESCALATOR

DESCRIPTION

This application is a continuation of application Ser. No. 294,087, filed Aug. 19, 1981, now abandoned.

CROSS-REFERENCE TO RELATED APPLICATIONS

The apparatus described herein may use apparatus described in copending application Ser. No. 254,360, filed on Apr. 14, 1981, now U.S. Pat. No. 4,411,352, by John L. Kettle for a RACETRACK ESCALATOR, which is commonly assigned herewith.

TECHNICAL FIELD

This invention relates to escalators and similar conveyor systems for transporting passengers.

BACKGROUND ART

The typical escalator, as is well known, comprises a closed loop arrangement of interconnected stairs or steps which are propelled between floors, thereby providing a moving staircase, in effect, upon which passengers stand in order to be transported between the floors. The drive mechanism typically comprises a chain which is driven by electric motors. The stairs are connected to this chain which pulls the stairs on tracks that extend between the floors. The relative orientation of the tracks with respect to each other and the floors determines the position of the stairs. This track orientation is used to create the staircase arrangement that the passengers stand on in moving between the floors and to orient the stairs so that they return from the floor concealed below the staircase portion. Another similar conveyance system does not use staircases, but rather a continuous, flexible belt, somewhat like a conveyor, for transporting the passengers between the floors. That system is somewhat like an incline conveyor belt or ramp. A major difference between this ramp system and the traditional escalator system is that the ramp system takes up considerably more space because it must be inclined so as to enable passengers to stand on it comfortably, while the traditional escalator system accomplishes that result by providing the horizontally oriented stairs that they may stand upon when being transported.

Both systems, however, suffer the same common disadvantage: only 50% of the transporting surface area in the overall system is available at any time for transporting passengers. Up and down going passenger loads are not used to offset each other; this unduly wastes energy.

DISCLOSURE OF INVENTION

Objects of the present invention include providing a moving staircase system in which up and down going passenger loads offset each other, thereby recapturing energy; almost all passenger carrying area is used at all times and the space occupied by the system is as small as possible.

According to the present invention, a closed loop arrangement of interconnected stairs move in a spiral formation between floors. Each stair in the system is pie-shaped to allow it to move in the spiral formation between floors, and the adjacent stairs are pivotally interconnected at only one edge so that the stairs may separate along the opposite edge to move in a straight line to proceed from an ascending to descending spiral section and vice versa under the floor. The stairs are floor level at each floor to permit passengers to enter and exit the system comfortably and safely.

The present invention provides a closed loop escalator system in which up and down loads counterbalance each other. It provides a system in which far more than 50% of the stairs are usable at all times. The spiral formation provides extreme vertical rise between the floor and the system, and therefore takes up far less space than comparable prior systems. A feature is that it provides an escalator system that has an architecturally pleasing and novel appearance, and another feature is that the use of spiral sections permits service to more than two floors.

Yet, other objects, benefits and features will be apparent to one skilled in the art from the following detailed description of exemplary embodiments thereof, as illustrated in the accompanying drawings.

BRIEF DESCRIPTION OF DRAWINGS

FIG. 1 is a perspective view of a spiral escalator system according to the present invention;

FIG. 2 is a perspective view of a portion of an up or down spiral section in the system;

FIG. 3 is an elevational view taken along the line 3—3 in FIG. 2 in a spiral section of the system.

BEST MODE FOR CARRYING OUT THE INVENTION

Figure 4:
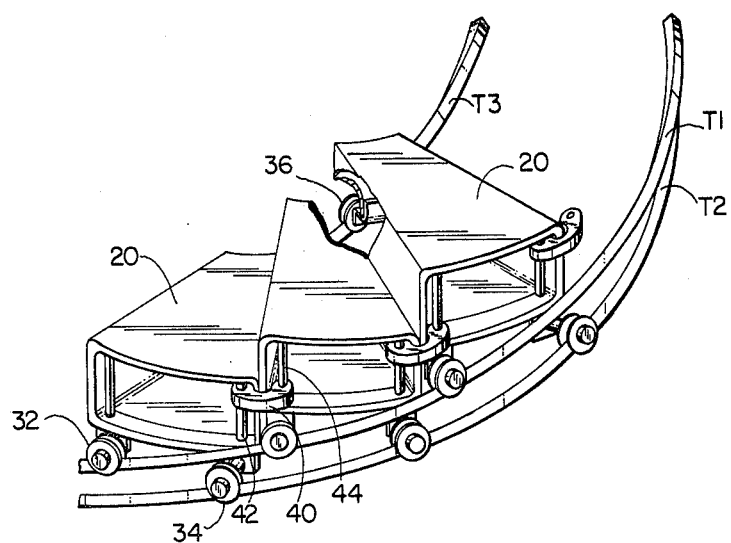
FIG. 4 is a perspective view of a spiral section and is similar to FIG. 2 except that it contains a cutaway view of a stair to expose a roller and track along the innermost portion of the section.

Referring to FIG. 1, the spiral escalator system shown there provides escalator service for transporting passengers between two floors F1 and F2. The spiral escalator system includes two columns 10 and 12 which extend vertically between the two floors F1 and F2. These columns are vertically displaced somewhat from the edge F1A and F2A of each floor. The system includes a plurality of pie-shaped escalator stairs or steps 20 that move around in a pattern that includes spiral up and down sections S1 and S2. Each step moves around the pattern and when it nears the floor level, passes underneath a portion of the floor. (See, for example, step 20A and step 20B). Thus, each step passes from an up (ascending) to down (descending) section and vice versa by passing underneath the floor, a step position that enables passengers to step off on to the floor easily In the floor sections the steps 20 are separated along their inner edge 24, but when they come to the spiral sections that spiral around the pillars 10 and 12, they bunch up together, so to speak, along that inner edge to form the spiral moving staircase sections S1 and S2.

Observing FIG. 1 and also FIG. 2, the steps ride on tracks which define the pattern in which they move. Tracks T1 and T2, which are elevated relative to each other, define an outer step path in the pattern. Track T3 defines the inner path that follows the path 24. FIG. 3 shows that the tracks may be supported on a reenforced bracket 30 that is attached to each pillar. These brackets are spaced apart on each pillar along the spiral path of the staircase.

Each step 20 rides on three rollers 32, 34, and 36 (not shown in FIG. 1) that roll on tracks T1, T2 and T3 respectively, track T2 being below and outboard from track T1, as FIG. 3 shows. (FIG. 4 shows the roller 36 on the track T3.) Each roller 34 is attached to an outrigger 34A (shown only on one step 20 in FIG. 2, cutaway at X on the other steps to expose other components on the other steps in each FIGS. 2 and 3) to accommodate the outward position of track T2 from track T1. In the spiral sections the tracks are inclined and the steps thus follow the incline and elevate relative to each other to form the staircase configuration in the sections S1 and S2. At the floor levels, however, the tracks are horizontal relative to the floors F1 and F2, and the steps therefore are horizontal and level with the floor and each other. The steps follow the tracks T1, T2 and T3 which pass underneath each floor.

Adjacent steps 20 (e.g. 20E, 20F in FIG. 2) are interconnected by means of a biaxis linkage arrangement that comprises a link bar 40 and two vertically oriented link bar pivot pins 42 and 44. The link bar is free to slide vertically and rotate on pins 42 and 44. Thus, adjacent steps can pivot and elevate relative to each other at the position of the biaxis linkage. There, however, is no connection between the steps along the innermost edge (24 in FIG. 1) that is defined by the path of track T3. Therefore, on one side the steps spread apart or separate at the floor levels, even though they are connected on the opposite side from the path 24. This is attributed to the biaxis, which also allows formation of the spiral sections in the ascending and descending sections S1 and S2 (yet allows the steps to pass in a straight path between the two sections at the floor levels), since the steps can also elevate relative to each other. The weight of the steps in the ascending and descending sections forces them together and they bunch up to form the spiral sections.

The propulsion system for the system is not shown because it is easily understood and derived from the prior art. Propulsion may be accomplished by means of a motor drawn cable that moves around the system's outer perimeter that is defined by the tracks T1 and T2. The stairs may be coupled to this cable by cable connection means that are well known in the art. Alternatively, a chain arrangement may be used (as in many escalators) in lieu of the cable, or the stairs may be individually propelled (or selective ones may be) by means of individual electric motors in a traction drive arrangement with one or more of the tracks T1, T2 and T3.

A variation on the system may have the biaxis linkage on the inside 52, rather than outside 50. Placing the linkage there also enables the steps to separate in the horizontal sections, but along the outside, not inside, of the pattern.

Although the invention has been shown and described with respect to exemplary embodiments thereof, it should be understood by those skilled in the art that the foregoing and various other changes, omissions and additions may be made therein and thereto, without departing from the true scope and spirit of the invention embodied therein.

I claim:

1. A system for moving people between two or more floors, characterized by:
    coupled steps that move in a closed pattern, having inner and outer perimeters between the floors,
    a biaxis linkage for coupling adjacent steps to enable them to pivot about a rotation axis that is perpendicular to either the inner or outer perimeter,
    a track system for guiding the steps in the pattern,
    a pair of vertical supports that extend between the floors for supporting the tracks,
    means for propelling the steps along the tracks,
    said closed pattern having sections that spiral around the supports between the floors, in which the steps form a staircase, and substantially straight, horizontal sections which extend between the spiral sections and which are located below each floor,
    said track system comprising a single track along the inner perimeter of the pattern and two tracks along the outer perimeter, said two tracks being vertically disposed in the staircase and the higher of the two being horizontally disposed outward from the outer perimeter relative to the other, each step having a guide roller riding on said higher track, which roller is on an arm which extends over the lower track,
    a biaxis linkage for connecting said steps along the outer perimeter, said linkage being the only connection between adjacent steps and comprising a vertical pin on each step, the pins being located between the corners of adjacent steps at the outer perimeter, and an arm connected to the pins of adjacent steps which can rotate about and slide vertically on said pins, and
    each step having a generally triangular shape like a pie slice to provide a generally triangular space between adjacent steps in said horizontal sections of the pattern.

* * * * *